(12) United States Patent
Bouchet et al.

(10) Patent No.: US 11,886,371 B2
(45) Date of Patent: Jan. 30, 2024

(54) RESCHEDULING MECHANISM FOR ASYNCHRONOUS DEVICES

(71) Applicant: Ratier-Figeac SAS, Figeac (FR)

(72) Inventors: Arnaud Bouchet, Planioles (FR); Patrice Garanx, Cajarc (FR)

(73) Assignee: RATIER-FIGEAC SAS, Figeac (FR)

( * ) Notice: Subject to any disclaimer, the term of this patent is extended or adjusted under 35 U.S.C. 154(b) by 1 day.

(21) Appl. No.: 17/858,217

(22) Filed: Jul. 6, 2022

(65) Prior Publication Data
US 2023/0013461 A1 Jan. 19, 2023

(30) Foreign Application Priority Data

Jul. 19, 2021 (EP) .................................. 21290048

(51) Int. Cl.
| | |
|---|---|
| *G06F 13/00* | (2006.01) |
| *G06F 13/42* | (2006.01) |
| *G06F 1/10* | (2006.01) |
| *G06F 11/07* | (2006.01) |
| *G06F 13/40* | (2006.01) |

(52) U.S. Cl.
CPC ............ *G06F 13/4204* (2013.01); *G06F 1/10* (2013.01); *G06F 11/0754* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 4,750,171 A | 6/1988 | Kedar et al. | |
| 4,875,224 A | 10/1989 | Simpson | |
| 8,407,191 B1 * | 3/2013 | Nanda ................. | G06F 16/1748 707/654 |
| 2004/0261101 A1 | 12/2004 | Iwamura | |
| 2016/0203012 A1 * | 7/2016 | Dong ..................... | G06F 9/455 718/1 |
| 2021/0073118 A1 * | 3/2021 | Masuo .................. | G06F 3/0679 |

FOREIGN PATENT DOCUMENTS

GB 2217064 A 10/1989

OTHER PUBLICATIONS

European Search Report for Application No. 21290048.4-1216, dated Dec. 9, 2021, 67 pages.

* cited by examiner

*Primary Examiner* — Henry Tsai
*Assistant Examiner* — Dean Phan
(74) *Attorney, Agent, or Firm* — CANTOR COLBURN LLP

(57) ABSTRACT

An asynchronous first device in communication with an asynchronous second device. The time for the first device to complete a processing cycle is a first device major frame and the first device major frame comprises a first device dedicated processing time slot at the end of the first device major frame. The first device is configured to send a rescheduling signal to the second device when it has completed a first device major frame. The first device is configured, during every first device dedicated processing slot, to: monitor for a rescheduling signal sent from the second device to the first device; and if a rescheduling signal from the second device is received: reschedule the current first device major frame to a rescheduled first device major frame; wherein the end of the rescheduled first device major frame coincides with the time the rescheduling signal from the second device was received.

13 Claims, 3 Drawing Sheets

RESCHEDULING MECHANISM FOR ASYNCHRONOUS DEVICES

CROSS REFERENCE TO RELATED APPLICATIONS

This application claims priority to European Patent Application No. 21290048.4 filed Jul. 19, 2021, the entire contents of which is incorporated herein by reference.

FIELD

The examples disclosed herein relate to systems and methods for a rescheduling mechanism for asynchronous devices.

BACKGROUND

Asynchronous devices are devices that operate without reference to a global clock system. The processing clock of asynchronous devices therefore operates independently of any frequency in the system to which the device is connected to. When considering two asynchronous devices, these devices will exhibit asynchronous behaviour relative to each other even if they appear identical from a hardware and software perspective. This is due to the tolerances on the components and the processing clock. The result of this asynchronous behaviour is that the processing cycle of one device will be slower than the processing cycle of the other device. This can cause divergence in systems that use two asynchronous devices such as dual motor control systems. In such situations, an additional mechanism is needed to prevent this divergence.

One way to solve this problem is to synchronize one of the devices with the other device. This results in a dependency between the devices in what is known as a master/slave relationship. There are three main issues that can result from this. A first is that it must be decided which device becomes the "master" device, to which the "slave" device will be synchronized with. A second issue is how to handle situations when the "master" device is lost and the slave device therefore loses its reference of the "master" device. A third issue is how to handle a "babbling idiot" event of the "master" device. A babbling idiot even relates to situations when a device malfunctions and sends data at inappropriate times.

SUMMARY

According to a first aspect, an asynchronous first device is in communication with an asynchronous second device is described herein. The time for the first device to complete a processing cycle is a first device major frame. The first device major frame comprises a first device dedicated processing time slot at the end of the first device major frame. The first device is configured to send a rescheduling signal to the second device when it has completed a first device major frame. The first device is configured, during every first device dedicated processing slot, to: monitor for a rescheduling signal sent from the second device to the first device; and if a rescheduling signal from the second device is received: shift the end of the current first device major frame by a set duration to result in a rescheduled first device major frame; and reschedule the subsequent first device major frames such that each subsequent rescheduled first device major frame starts as soon as the previous rescheduled first device major frame has ended.

Optionally, the first device is further configured to, after start-up, monitor for a rescheduling signal sent from the second device to the first device; and if a rescheduling signal from the second device is received: initiate the first device major frame such that the start of the first device major frame coincides with the time the rescheduling signal from the second device was received.

Optionally, the first device is further configured to after start-up, monitor for a rescheduling signal sent from the second device to the first device; and if no rescheduling signal from the second device is received after a waiting period: initiate the first device major frame after a timeout period.

Optionally, the first device is further configured to, when the end of the current first device major frame is shifted by a set duration to result in a rescheduled first device major frame, modify the duration of the current first device major frame by the set duration.

Optionally, the set duration is determined based on the maximum error of the clock tolerances between the first device and the second device.

Optionally, the set duration is a rounded value of the sum of the clock tolerances of each of the first device and the second device.

According to a second aspect, the asynchronous second device can function in the same way as the asynchronous first device. That is, the time for the second device to complete a processing cycle is a second device major frame; wherein the second device major frame comprises a second device dedicated processing time slot at the end of the second device major frame, wherein the second device is configured to send a rescheduling signal to the first device when it has completed a second device major frame; and wherein the second device is configured, during every second device dedicated processing slot, to: monitor for a rescheduling signal sent from the first device to the second device; and if a rescheduling signal from the first device is received: shift the end of the current second device major frame by a set duration to a rescheduled second device major frame, reschedule the subsequent second device major frames such that each subsequent rescheduled second major frame starts as soon as the previous rescheduled second device major frame has ended.

According to a third aspect, a method for rescheduling an asynchronous first device in communication with an asynchronous second device is described herein. The time for the first device to complete a processing cycle is a first device major frame. The first device major frame comprises a first device dedicated processing time slot at the end of the first device major frame; the method comprising: sending a rescheduling signal to the second device on completion of a first device major frame; and monitoring, during the dedicated processing time slot, for a rescheduling signal sent from the second device to the first device; if a rescheduling signal from the second device is received: shifting the end of the first device major frame by a set time duration to result in a rescheduled first device major frame, and rescheduling each subsequent first device major frame such that each subsequent rescheduled first device major frame is scheduled to start as soon as the previous rescheduled first device major frame has ended.

Optionally, the method further comprises: after start-up, monitoring for a rescheduling signal sent from the second device to the first device; and if a rescheduling signal from the second device is received: initiating the first device major frame such that the start of the first device major frame coincides with the time the rescheduling signal from the second device was received.

Optionally, the method further comprises: after start-up, monitoring for a rescheduling signal sent from the second device to the first device; and if no rescheduling signal from the second device is received on or after a or the waiting period: initiating the first device major frame after a timeout period.

Optionally, the set duration is determined based on the maximum error of the clock tolerances between the first device and the second device.

Optionally, the set duration is a rounded value of the sum of the clock tolerances of each of the first device and the second device.

As for the device described above, the method can function in such a way that the second device performs the same method steps as the first device, wherein the time for the second device to complete a processing cycle is a second device major frame. The second device major frame comprises a second device dedicated processing time slot at the end of the second device major frame. The method comprises: sending a rescheduling signal to the first device on completion of a first device major frame; and monitoring, during the dedicated processing time slot, for a rescheduling signal sent from the first device to the second device; if a rescheduling signal from the first device is received: shifting the end of the second device major frame by a set time duration to result in a rescheduled second device major frame, and rescheduling each subsequent second device major frame such that each subsequent rescheduled second device major frame is scheduled to start as soon as the previous rescheduled second device major frame has ended.

DETAILED DESCRIPTION

The examples described herein provide a rescheduling mechanism for two asynchronous devices which does not rely on the synchronizing the two devices using a master/slave principle so that the rescheduling is not affected by the failure of one of the devices. Furthermore, the rescheduling mechanism described herein is simple, robust to failure, of low cost to implement, and does not affect the inner characteristics of the devices.

A rescheduling mechanism is therefore disclosed herein for two asynchronous devices that is simple and does not involve synchronization of the two devices using a master/slave principle. "Not involving synchronization" means that this rescheduling mechanism does not modify the inner characteristics of each of the asynchronous devices in terms of real time sequencing.

Figure 1:
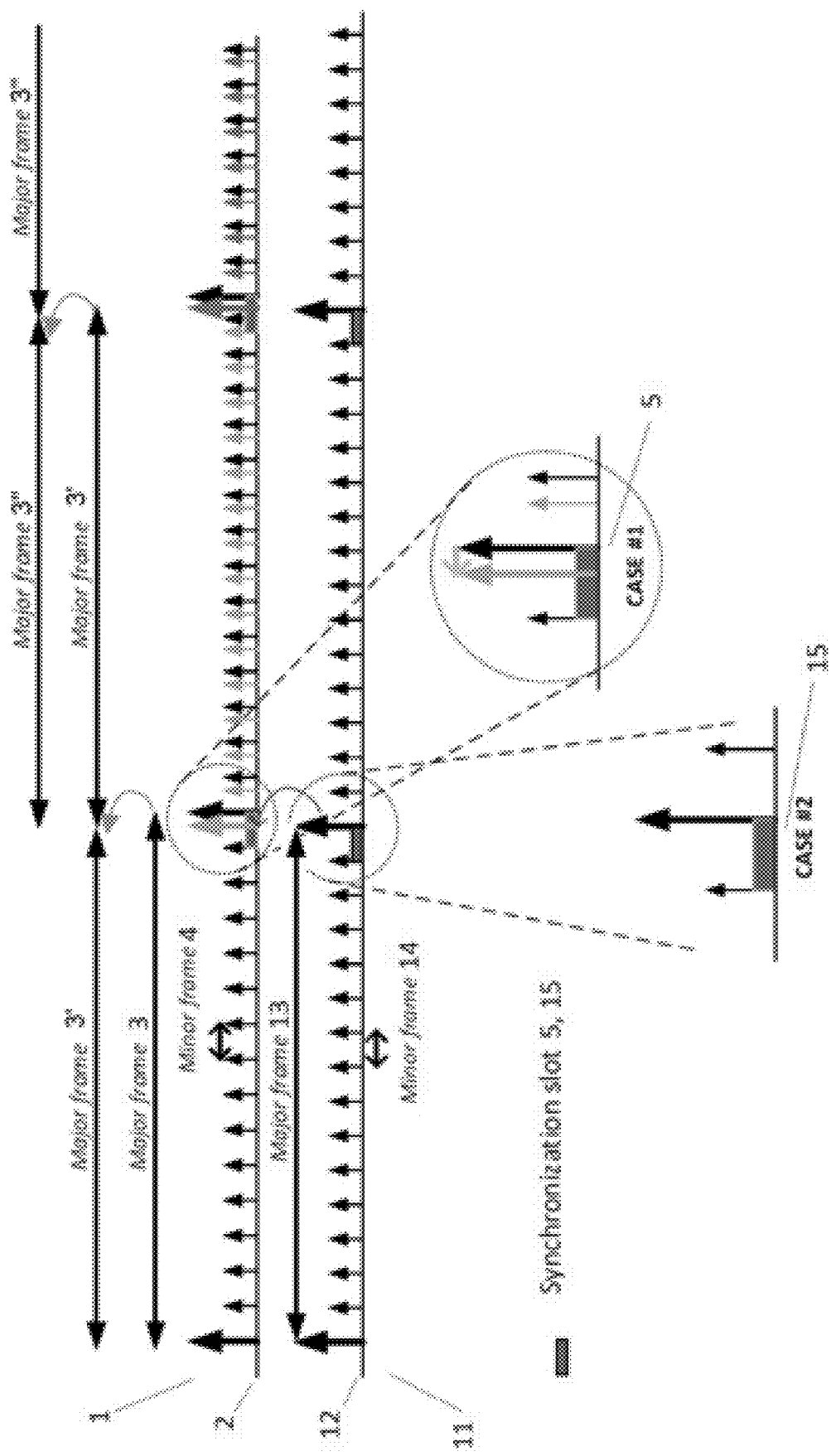
FIG. 1 shows a rescheduling mechanism for two asynchronous devices in accordance with a first example described herein.

As shown in FIG. 1, a first device 1 has a first processing clock 2 which operates at a first frequency. A second device 11 has a second processing clock 12 which operates at a second frequency. Due to the manufacturing tolerances of the first device 1 and the second device 11, the first frequency is different from the second frequency.

Each of the first device 1 and the second device 2 complete rounds of respective processing cycles. The processing cycle of the first device 1 takes place within a time duration which is referred to as a first device major frame 3, and the processing cycle of the second device 1 takes place within a time duration which is referred to as a second device major frame 13. As shown in FIG. 1, the first device major frame 3 has a longer duration than the second device major frame 13. However, the alternative situation is also envisaged where the first device major frame 3 has a shorter duration than the second device major frame 13.

Towards the end of each of the first device major frame 3 and the second device major frame 13, each of the first 1 and second 11 devices have a respective dedicated processing time slot 5, 15, within which rescheduling of either the first device 1 or the second device 11 is possible. The first device 1 has a first device dedicated processing time slot 5, and the second device 11 has a second device dedicated processing time slot 15. The first device dedicated processing time slot 5 has a time duration which is referred to as first device minor frame 4, and the second device dedicated processing time slot 15 has a time duration which is referred to as the second device minor frame 14. Once a device 1, 11 enters its respective dedicated processing time slot 5, 15, the main execution of the processing cycle of the device 1, 11 will have been completed. The dedicated processing time slot 5, 15 therefore corresponds to a short time period wherein the processing cycle has not ended but the main steps of the processing cycle have been completed. Rescheduling the devices 1, 11 during their dedicated processing time slot 5, 15 therefore does not affect the real time sequencing of the device 1, 11.

Each of the first device 1 and the second device 11 are configured to send a rescheduling signal to the other device 1, 11 when it has completed its respective major frame 3, 13. The ending of the first or second major frame 3, 13 coincides with the end of the first or second dedicated processing time slot 5, 15. The rescheduling signal can comprise one or more signals which indicate that the processing cycle of the device 1, 11 has been completed. The rescheduling signal can be simple such as a discrete interface, which is of low cost to implement.

The devices 1, 11 will only monitor and respond to the rescheduling signal if it is received by the device 1, 11 during its respective dedicated processing time slot 5, 15. If one of the devices 1, 11 receives the rescheduling signal during its dedicated processing time slot 5, 15, the end of the current major frame 3, 13 of the device 1, 11 will be modified to end earlier (or later) by a set duration which results in a rescheduled major frame 3', 13'. The end of the rescheduled major frame 3', 13' will be closer in phase to the end of the major frame 3, 13 of the device 1, 11 that sent the rescheduling signal. A consequence of altering the current major frame 3, 13 to be shorter (or longer) is that the start of the next rescheduled major frame 3', 13' and all subsequent rescheduled major frames 3', 13' will be earlier (or delayed) compared to if no rescheduling had taken place. This rescheduling will remain in place until the device 1, 11 receives another rescheduling signal during its dedicated processing time slot 5, 15 at the end of its rescheduled major frame 3', 13'.

In the case of either shortening or lengthening the current major frame 3, 13 during rescheduling, it should be appreciated that the major frame characteristics will be modified for the current major frame 3, 13 only. All subsequent rescheduled major frames 3', 13' will have the default major frame duration. It is only the start and end times of the rescheduled major frames 3', 13' that has changed. The scheduling will not change until rescheduling happens again.

If no rescheduling signal is received by either of the devices during 1, 11 during their respective dedicated processing time slots 5, 15, no rescheduling of the major frame 3, 13 will occur for either device 1, 11.

The devices 1, 11 can be configured such that when rescheduling takes place, the set duration by which current major frame 3, 13 of the device 1,11 is shifted can either be a smaller or larger amount. If the current major frame 3, 13 is shifted by a small amount, then rescheduling events will take place more often. The advantage of this is that the major frames 3, 13 of the devices 1, 11 will eventually be very close and have a small amount of jitter. A disadvantage of this is that due temperature changes or ageing of the hardware, the rescheduling conditions of the rescheduled device 1, 11 may be lost.

An alternative is to shift the major frame 3, 13 by a large amount. Advantageously, the rescheduling conditions will not be lost due to temperature changes of ageing of the device 1, 11. When the major frame 3, 13 is shifted by a larger amount, there will be relatively higher jitter between the devices 1, 11 compared to when the major frame 3, 13 is shifted by a smaller amount. However, the jitter in this case may not be problematic, as shown below.

The value of the set duration by which a major frame 3, 13 is shifted can be determined based on the clock tolerances of the devices 1, 11. For example, the set duration may be a rounded value of the sum of the clock tolerances of each of the devices 1, 11. If both of the devices 1, 11 have a clock tolerance of 8 ns, the set duration can be set to 20 ns. In this scenario, if the major frames 3, 13 have a duration of 300 μs and one of the devices 1, 11 is rescheduled by 20 ns, the jitter will only be 0.5% of the major frame 3, 13, which is negligible.

In the example shown in FIG. 1, the second device 11 completes its second major frame 13 before the first device 1 and sends the rescheduling signal to the first device 1. As shown in case #1, because the rescheduling signal is received by the first device 1 during its dedicated processing time slot, the first device 1 has the end of its major frame 3 shifted by a set time duration, which results in a rescheduled major frame 3'. In this example, the rescheduled major frame 3' is rescheduled to end earlier which makes it closer in phase to the second device 11. Other examples are also envisaged wherein the rescheduled major frame 3' is rescheduled to end later. The subsequent major frames 3' are rescheduled so that they begin as soon as the previous major frame 3' has ended.

As can be seen in FIG. 1, the first device 1 also receives a rescheduling signal during the dedicated processing slot 5 of the subsequent first device major frame 3'. The first device major frame 3' is therefore rescheduled to end earlier by the set time duration, which results in a rescheduled major frame 3''.

Case #2 shows the situation where no rescheduling takes place. Since the first device 1 has sent a rescheduling signal to the second device 11 when the second device 11 is outside of its dedicated processing time slot 15, there is no rescheduling of the second device major frame 13.

It should be appreciated that the major frame duration is not modified for either of the devices 1, 11, but rescheduling will shorten the length of the current major frame, or instantaneous cycle duration of the device 1, 11 receiving the rescheduling signals from the other device 1, 11 during its dedicated processing time slot 5, 15.

If one the devices 1, 11 malfunctions, for example, by becoming a "babbling idiot" and sends a burst of rescheduling signals to the other deice 1,11, the other device will only consider this faulty rescheduling signal during the dedicated processing time slot. The other device 1, 11 will therefore not have its inner functioning affected by the malfunctioning device 1, 11. The rescheduling mechanism is therefore fault tolerant.

Figure 2:
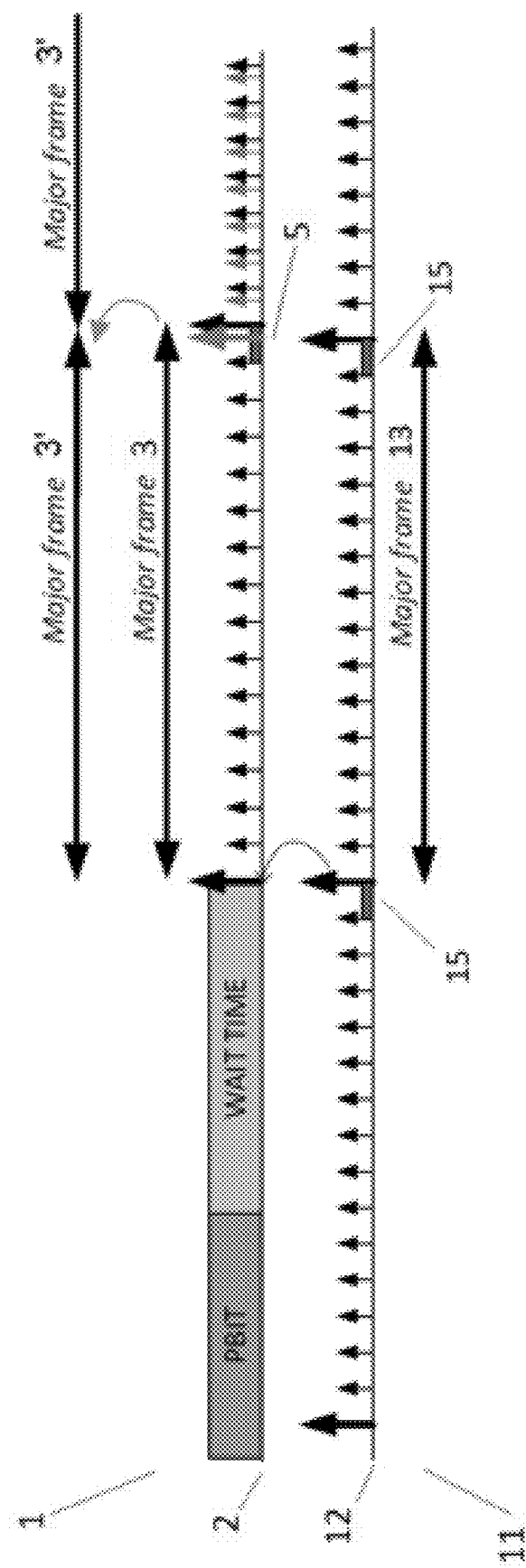
FIG. 2 shows the rescheduling mechanism during start-up of one of the asynchronous devices when the other asynchronous device is functioning in accordance with an example described herein.

Turning to FIG. 2, rescheduling of the asynchronous devices 1, 11 will now be described following start-up of one of the devices 1. In the example shown in FIG. 2, the first device 1 starts up after a reset and the second device 11 is functioning normally. Once the first device 1 has completed its Power On Built I Test, or Power On Self Test (POST), the first device 1 will wait until it has received the rescheduling signal from the second device 11. Upon receiving the rescheduling signal, the first device 1 will start its first device major frame 3. The first device major frame 3 will therefore be in phase with the start of the major frame 13 of the second device 11.

Figure 3:
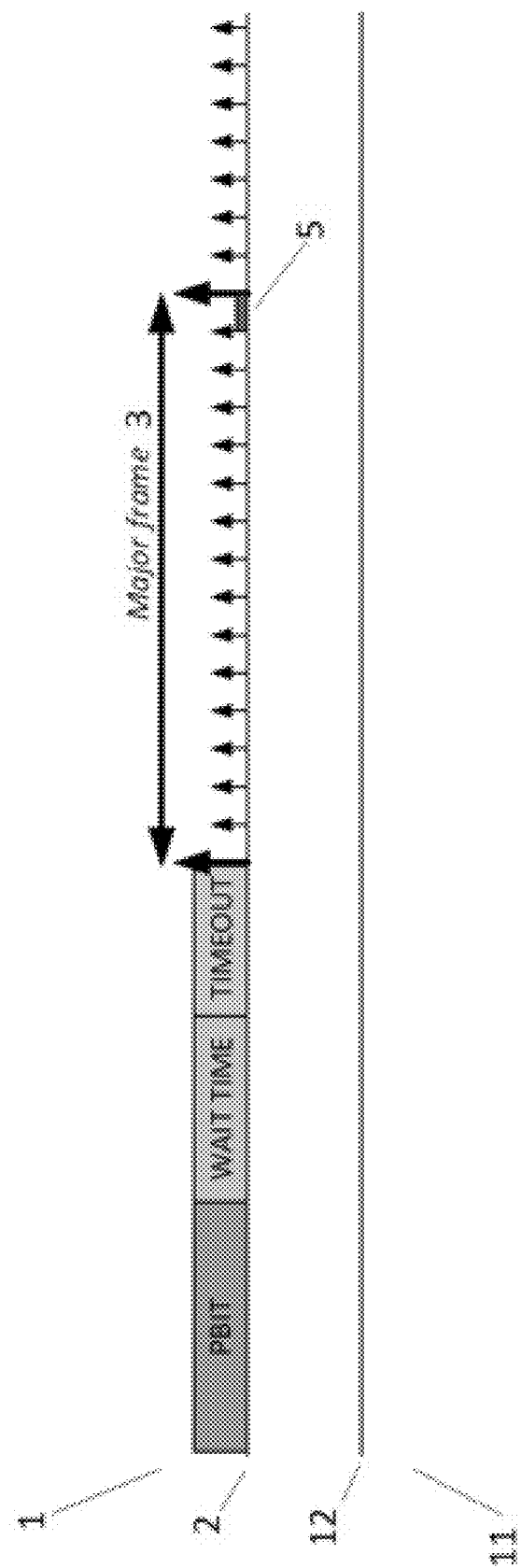
FIG. 3 shows the rescheduling mechanism during start-up of one of the asynchronous devices when the other asynchronous device is not functioning in accordance with an example described herein.

In the event that one of the devices 1, 11 is not functioning when the other device 1, 11 has been reset, the other device will perform its processing cycle with its predefined major frame 3, 13 after a waiting period and a dedicated timeout. As shown in FIG. 3, the second device 11 is not functioning, which can be due to the device 11 not being powered, being faulty, or having its communication link broken. Since the first device 1 does not receive a rescheduling signal from the second device 11, a dedicated timeout in the first device 1 will automatically start the first device major frame 3 of the first device. The rescheduling mechanism is therefore fault tolerant.

Although the above examples in relation to FIGS. 2 and 3 are described in relation to the first device 1 being reset and the second device 11 either functioning normally or not functioning, the above described examples can also be applied to the situation where the second device 11 is being reset and the first device 1 is either functioning normally or not functioning.

The implementation of the above described rescheduling mechanism can be of low cost, since the rescheduling signal can be simple such as a discrete interface. The above described rescheduling mechanism is also robust to failure, because a device will only be rescheduled during its dedicated processing time slot 5, 15, by which time the major steps of the processing cycle of the device will have been completed. Therefore, if one of the devices malfunctions, the other device will not be negatively influenced by this. The above described rescheduling mechanism can also be applied during start-up of the devices. In this instance, the rescheduling mechanism is also robust to either malfunction or failure of one of the devices.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. An asynchronous first device in communication with an asynchronous second device;
   wherein the time for the first device to complete a processing cycle is a first device major frame;

wherein the first device major frame comprises a first device dedicated processing time slot at the end of the first device major frame, wherein the first device is configured to send a rescheduling signal to the second device when it has completed a first device major frame; and wherein the first device is configured, during every first device dedicated processing slot of every first device major frame, to:
monitor for a rescheduling signal sent from the second device to the first device; and
if a rescheduling signal from the second device is received:
shift the end of the current first device major frame by a set duration to result in a rescheduled first device major frame;
reschedule the subsequent first device major frames such that each subsequent rescheduled first device major frame starts as soon as the previous rescheduled first device major frame has ended.

2. The asynchronous first device of claim 1; wherein the first device is further configured to:
after start-up, monitor for a rescheduling signal sent from the second device to the first device; and
if a rescheduling signal from the second device is received:
initiate the first device major frame such that the start of the first device major frame coincides with the time the rescheduling signal from the second device was received.

3. The asynchronous first device of claim 1, wherein the first device is further configured to:
after start-up, monitor for a rescheduling signal sent from the second device to the first device; and
if no rescheduling signal from the second device is received after a waiting period:
initiate the first device major frame after a timeout period.

4. The asynchronous first device of claim 1, wherein the first device is further configured to, when the end of the current first device major frame is shifted by a set duration to result in a rescheduled first device major frame, modify the duration of the current first device major frame by the set duration.

5. The asynchronous first device of claim 1, wherein the set duration is determined based on the maximum error of the clock tolerances between the first device and the second device.

6. The asynchronous first device of claim 4, wherein the set duration is a rounded value of the sum of the clock tolerances of each of the first device and the second device.

7. The asynchronous first device in communication with the asynchronous second device of claim 1,
wherein the time for the second device to complete a processing cycle is a second device major frame;
wherein the second device major frame comprises a second device dedicated processing time slot at the end of the second device major frame,
wherein the second device is configured to send a rescheduling signal to the first device when it has completed a second device major frame; and
wherein the second device is configured, during every second device dedicated processing slot, to:
monitor for a rescheduling signal sent from the first device to the second device; and
if a rescheduling signal from the first device is received:
shift the end of the current second device major frame by a set duration to result in a rescheduled second device major frame,
reschedule the subsequent second device major frames such that each subsequent rescheduled second device major frame starts as soon as the previous rescheduled second device major frame has ended.

8. A method for rescheduling an asynchronous first device in communication with an asynchronous second device, wherein the time for the first device to complete a processing cycle is a first device major frame; and wherein the first device major frame comprises a first device dedicated processing time slot at the end of the first device major frame; the method comprising:
sending a rescheduling signal to the second device on completion of a first device major frame; and
monitoring, during the dedicated processing time slot, for a rescheduling signal sent from the second device to the first device;
if a rescheduling signal from the second device is received:
shifting the end of the current first device major frame by a set duration to result in a rescheduled first device major frame;
rescheduling each of the subsequent first device major frames such that each subsequent rescheduled first device major frame starts as soon as the previous rescheduled first device major frame has ended.

9. The method for claim 8, further comprising:
after start-up, monitoring for a rescheduling signal sent from the second device to the first device; and
if a rescheduling signal from the second device is received:
initiating the first device major frame such that the start of the first device major frame coincides with the time the rescheduling signal from the second device was received.

10. The method of claim 8, further comprising:
after start-up, monitoring for a rescheduling signal sent from the second device to the first device; and
if no rescheduling signal from the second device is received on or after a or the waiting period:
initiating the first device major frame after a timeout period.

11. The asynchronous first device of claim 8, wherein the first device is further configured to, when the end of the current first device major frame is shifted by a set duration to result in a rescheduled first device major frame, modify the duration of the current first device major frame by the set duration.

12. The method of claim 8, wherein the set duration is determined based on the maximum error of the clock tolerances between the first device and the second device.

13. The method of claim 12, wherein the set duration is a rounded value of the sum of the clock tolerances of each of the first device and the second device.

* * * * *